United States Patent
Sartori et al.

(10) Patent No.: US 9,602,255 B2
(45) Date of Patent: Mar. 21, 2017

(54) SYSTEM AND METHOD FOR DATA CHANNEL TRANSMISSION AND RECEPTION

(71) Applicant: FutureWei Technologies, Inc., Plano, TX (US)

(72) Inventors: Philippe Sartori, Algonquin, IL (US); Anthony C. K. Soong, Plano, TX (US); Fredrik Berggren, Upplands Vaesby (SE)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 101 days.

(21) Appl. No.: 13/651,111

(22) Filed: Oct. 12, 2012

(65) Prior Publication Data
US 2013/0094458 A1    Apr. 18, 2013

Related U.S. Application Data

(60) Provisional application No. 61/546,878, filed on Oct. 13, 2011.

(51) Int. Cl.
| | | |
|---|---|---|
| H04L 12/54 | (2013.01) | |
| H04W 28/00 | (2009.01) | |
| H04L 5/00 | (2006.01) | |
| H04W 72/04 | (2009.01) | |

(52) U.S. Cl.
CPC ........... *H04L 5/003* (2013.01); *H04L 5/0044* (2013.01); *H04L 5/0094* (2013.01); *H04W 72/042* (2013.01)

(58) Field of Classification Search
CPC ............ H04W 72/042; H04W 72/0406; H04L 5/0094; H04L 5/0044; H04L 5/003
USPC ....... 370/328, 336, 329, 204, 330, 431, 450, 370/451; 455/434, 450, 522
See application file for complete search history.

(56) References Cited

U.S. PATENT DOCUMENTS

| | | | |
|---|---|---|---|
| 2002/0082020 A1* | 6/2002 | Lee et al. | 455/450 |
| 2008/0298224 A1* | 12/2008 | Pi et al. | 370/204 |
| 2009/0175159 A1 | 7/2009 | Bertrand et al. | |
| 2009/0252075 A1 | 10/2009 | Ji et al. | |
| 2010/0232546 A1 | 9/2010 | Yu et al. | |
| 2011/0044261 A1 | 2/2011 | Cai et al. | |

(Continued)

FOREIGN PATENT DOCUMENTS

| | | |
|---|---|---|
| WO | 2010129605 A1 | 11/2010 |
| WO | 2011085195 A1 | 7/2011 |

OTHER PUBLICATIONS

LTE, Evolved Universal Terrestrial Radio Access (E-UTRA); Physical layer procedures (3GPP TS 36.213 version 10.2.0 Release 10), Jun. 2011.*

(Continued)

*Primary Examiner* — Alpus H Hsu
*Assistant Examiner* — Camquyen Thai
(74) *Attorney, Agent, or Firm* — Slater Matsil, LLP

(57) ABSTRACT

A method for operating a communications controller includes allocating a number of resource blocks to an enhanced physical downlink shared channel (ePDSCH), and identifying a starting point for the resource blocks of the ePDSCH, the starting point located within a control region of a subframe. The method also includes signaling to a user equipment (UE) the starting point of the resource blocks and the number of resource blocks allocated to the ePDSCH.

39 Claims, 6 Drawing Sheets

(56) References Cited

U.S. PATENT DOCUMENTS

| | | | |
|---|---|---|---|
| 2011/0103330 A1* | 5/2011 | Montojo et al. | 370/329 |
| 2011/0110296 A1* | 5/2011 | Malladi et al. | 370/328 |
| 2011/0165906 A1 | 7/2011 | Papasakellariou et al. | |
| 2011/0170496 A1 | 7/2011 | Fong et al. | |
| 2011/0249633 A1* | 10/2011 | Hong et al. | 370/329 |
| 2011/0317645 A1* | 12/2011 | Jen | 370/329 |
| 2012/0033650 A1* | 2/2012 | Ahn et al. | 370/336 |
| 2013/0044693 A1* | 2/2013 | Lindh | H04L 5/0026 370/329 |
| 2013/0094442 A1* | 4/2013 | Kim | H04W 72/0406 370/328 |
| 2013/0201926 A1* | 8/2013 | Nam et al. | 370/329 |

OTHER PUBLICATIONS

3GPP TSG-RAN R1-113680—Search Space for Enhanced Control Channels—p. 1.*

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.0.0, Technical Specification, Sep. 2012, 106 pages.

"3rd Generation Partnership Project; Technical Specification Group Radio Access Network; Evolved Universal Terrestrial Radio Access (E-UTRA); Physical layer procedures (Release 11)," 3GPP TS 36.213, V11.0.0, Technical Specification, Sep. 2012, 143 pages.

International Search Report and Written Opinion of Patent Cooperation Treaty (PCT), International Application No. PCT/US12/60080, Huawei Technologies Co., Ltd., date of mailing Dec. 20, 2012, 9 pages.

Extended European Search Report received in Application No. 12840000.9-1851, mailed Sep. 26, 2014, 11 pages.

LG Electronics, Inc., "PDSCH Starting Symbol Indication for Cross-Carrier Scheduling," TSG-RAN WG1 Meeting #61, R1-102707, Montreal, Canada May 10-14, 2010, 4 pages.

NTT DOCOMO, "On RRC Signaling of PDSCH Starting Position," 3GPP TSG RAN WG1 Meeting #61bis, R1-104011, Dresden Germany, Jun. 28-Jul. 2, 2010, 2 pages.

Alcatel-Lucent Shanghai Bell et al., "Backhaul Performance Requirement for Relay," 3GPP TSG RAN WG4 Meeting #57AH, R4-110354, Austin, USA, Jan. 17-21, 2011, 4 pages.

* cited by examiner

750
SEARCH IN PCFICH FOR ePDSCH STARTING SYMBOL INDICATOR

755
SEARC RRC PARAMETER FOR ePDSCH STARTING SYMBOL INDICATOR

760
SEARCH IN COMMON SEARCH SPACE FOR ePDSCH STARTING SYMBOL INDICATOR

765
SEARCH IN PART OF GRANT FOR ePDSCH STARTING SYMBOL INDICATOR

SYSTEM AND METHOD FOR DATA CHANNEL TRANSMISSION AND RECEPTION

This application claims the benefit of U.S. Provisional Application No. 61/546,878, filed on Oct. 13, 2011, entitled "System and Method for Data Channel Transmission and Reception," which application is hereby incorporated herein by reference.

TECHNICAL FIELD

The present disclosure relates generally to digital communications, and more particularly to a system and method for data channel transmission and reception.

BACKGROUND

As the demand for data increases, communications systems should increase the efficiency in which the spectrum is utilized. Within the context of industrial and technical standards, member companies are looking at ways to improve performance. As an example, in the Third Generation Partnership Project (3GPP) Long Term Evolution (LTE) Release 10 (Rel-10), at most 13 symbols per subframe can be used for data transmission. However, for 3GPP LTE Release 11 (Rel-11), a new control channel referred to as an enhanced physical downlink control channel (ePDCCH) is being specified. For user equipment (UE), also commonly referred to as users, subscribers, terminals, mobile stations, mobiles, and the like, the use of the ePDCCH for assignments may permit more symbols to be used for data transmission than when compared to UEs receiving assignments with a physical downlink control channel (PDCCH).

SUMMARY OF THE DISCLOSURE

Example embodiments of the present disclosure which provide a system and method for data channel transmission and reception.

In accordance with an example embodiment of the present disclosure, a method for operating a communications controller is provided. The method includes allocating, by the communications controller, a number of resource blocks to an enhanced physical downlink shared channel (ePDSCH). The method also includes identifying, by the communications controller, a starting point for the resource blocks of the ePDSCH, the starting point located within a control region of a subframe. The method further includes signaling, by the communications controller, to a user equipment (UE) the starting point of the resource blocks and the number of resource blocks allocated to the ePDSCH.

In accordance with another example embodiment of the present disclosure, a method for operating a user equipment (UE) is provided. The method includes decoding, by the UE, an enhanced physical downlink control channel to obtain a number of resource blocks allocated to an enhanced physical shared channel (ePDSCH). The method also includes determining, by the UE, a starting point for the ePDSCH, the starting point located in a control region of a subframe. The method further includes receiving, by the UE, the ePDSCH in accordance with the starting point and the number of resource blocks allocated to the ePDSCH.

In accordance with another example embodiment of the present disclosure, a communications controller is provided. The communications controller includes a processor, and a transmitter operatively coupled to the processor. The processor allocates a number of resource blocks to an enhanced physical downlink shared channel (ePDSCH), and identifies a starting point for the resource blocks of the ePDSCH, the starting point located within a control region of a subframe. The transmitter signals to a user equipment (UE) the starting point of the resource blocks and the number of resource blocks allocated to the ePDSCH.

In accordance with another example embodiment of the present disclosure, a user equipment (UE) is provided. The UE includes a processor, and a receiver operatively coupled to the processor. The processor decodes an enhanced physical downlink control channel to obtain a number of resource blocks allocated to an enhanced physical shared channel (ePDSCH), and determines a starting point for the ePDSCH, the starting point located in a control region of a subframe. The receiver receives the ePDSCH in accordance with the starting point and the number of resource blocks allocated to the ePDSCH.

One advantage of an embodiment is that additional symbols per subframe may be used for data transmission, thereby increasing data rate, spectrum utilization, and efficiency.

A further advantage of an embodiment is that very little to no additional overhead is needed, thereby signaling overhead does not negatively impact data rate, spectrum utilization, and efficiency.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to data channel transmission and reception. For example, at a communications controller, the communications controller allocates a number of resource blocks to an enhanced physical downlink shared channel (ePDSCH), and identifies a starting point for the resource blocks of the ePDSCH, the starting point located within a control region of a subframe. The communications controller also signals to a user equipment (UE) the starting point of the resource blocks and the number of resource blocks allocated to the ePDSCH. As another example, at a UE, the UE decodes an enhanced physical downlink control channel to obtain a number of resource blocks allocated to an enhanced physical shared channel (ePDSCH), and determines a starting point for the ePDSCH, the starting point located in a control region of a subframe. The UE also receives the ePDSCH in accordance with the starting point and the number of resource blocks allocated to the ePDSCH.

The present disclosure will be described with respect to example embodiments in a specific context, namely a communications system that is compliant to 3GPP LTE Rel-10 and later with support for the ePDCCH. The disclosure may also be applied, however, to other standards compliant and non-standards compliant communications systems that allow non-control data to be transmitted in a control portion of a subframe.

Figure 1:
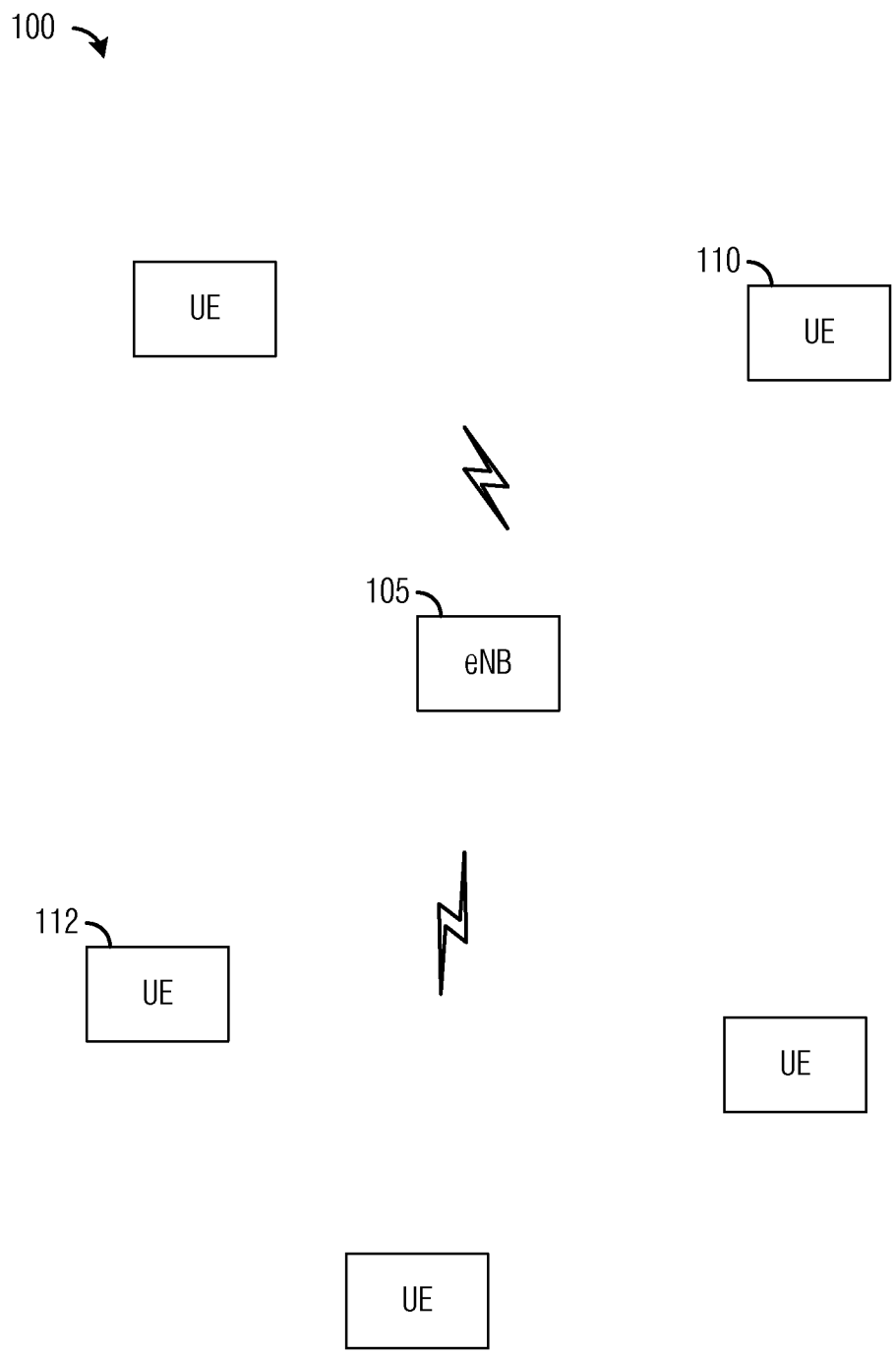
FIG. 1 illustrates an example communications system according to example embodiments described herein.

FIG. 1 illustrates a communications system 100. Communications system 100 includes an evolved Node B (eNB) 105 serving a plurality of UEs, such as UE 110 and UE 112. eNBs may also be commonly referred to as base stations, NodeB, communications controllers, controllers, base transceiver stations, access points, and the like.

eNB 105 controls communications to and from the UEs that it serves by scheduling resource grants to the UEs individually. As an example, eNB 105 may grant one or more resources to UE 110 for use in a downlink transmission, inform UE 110 of the granted resources, and then transmit data to UE 110. Similarly, eNB 105 may grant one or more resources to UE 112 for use in an uplink transmission, inform UE 112 of the granted resources, and then expect to receive an uplink transmission from UE 112 in the granted resources. The resources may be time resources, frequency resources, or a combination of time-frequency resources.

While it is understood that communications systems may employ multiple eNBs capable of communicating with a number of UEs, only one eNB, and five UEs are illustrated for simplicity.

Figure 2:
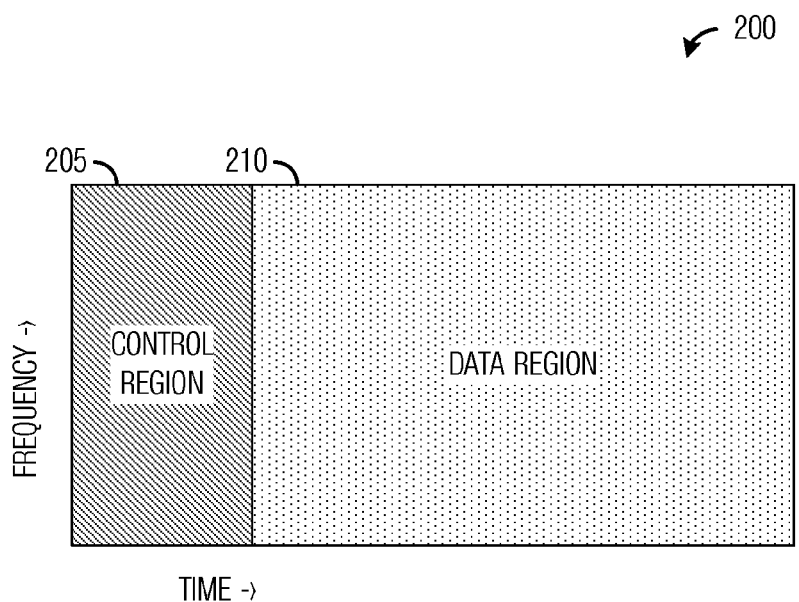
FIG. 2 illustrates an example structure of a subframe of a 3GPP LTE compliant communications system according to example embodiments described herein.

FIG. 2 illustrates a structure of a subframe 200 of a 3GPP LTE compliant communications system. Subframe 200 includes a control region 205 and a data region 210. Generally, control region 205 is used to communicate control information and data region 210 is used to communicate data. A control region may also be referred to as a control domain, while a data region may also be referred to as a data domain. A PDCCH is located in control region 205, usually in the first several symbols (e.g., one to four symbols) of subframe 200. A physical downlink shared channel (PDSCH) is located in data region 210 and is used to transmit data to UEs.

Other control channels, such as a physical hybrid indicator channel (PHICH), which is used to transmit acknowledgements/negative acknowledgements (ACK/NACK) in response to uplink data transmissions, physical control format indicator channel (PCFICH), which is used to indicate a number of symbols of control region 205 of subframe 200, for example, are located in control region 205. The PDDCH, PHICH, and the PCFICH are all located in control region 205.

Control region 205 comprises one or more control channel elements (CCEs). There is a mapping procedure for assigning the resource elements that comprise each CCE to both a time location and a frequency location within control region 205. A CCE may be use noncontiguous resources to exploit frequency diversity. A particular PDCCH may occupy 1, 2, 4, or 8 consecutive CCEs. A UE uses search space rules to identify possible CCEs that contain resource assignments (i.e., a PDCCH) for it. The search space rules may have provisions for a common search space.

In 3GPP LTE Rel-11, there is a proposal for another control channel to, amongst other things, assign resource grants to 3GPP LTE Rel-11 compliant UEs. The new control channel is referred to as an ePDCCH and is intended to be at least frequency-domain multiplexed (FDM) with an LTE subframe. Furthermore, the ePDCCH may also be time-domain multiplexed (TDM) or code-domain multiplexed (CDM) with other channels such as data channels. For simplicity, and without loss of generality, the discussion presented herein is made using FDM. It is noted that adding TDM and/or CDM components is straightforward.

Figure 3:
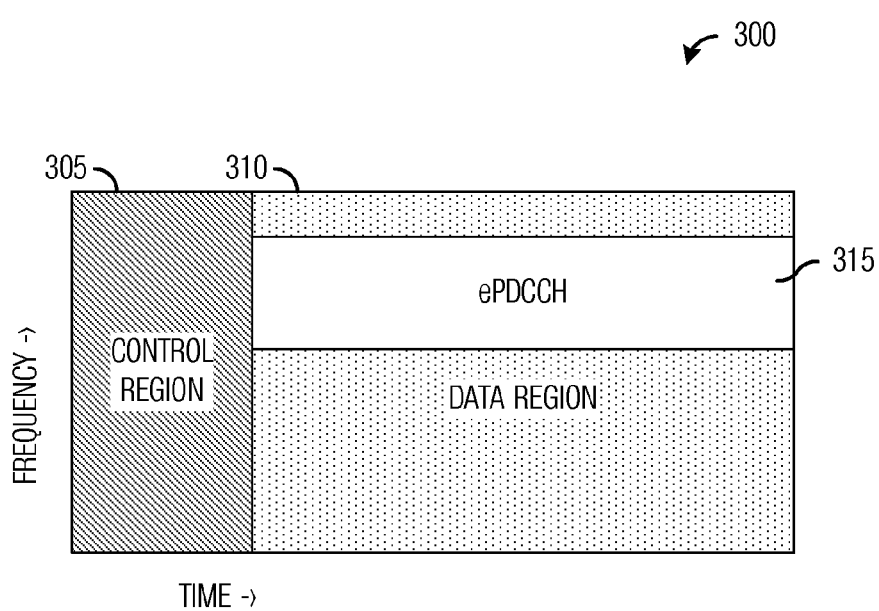
FIG. 3 illustrates an example structure of a first subframe of a 3GPP LTE compliant communications system highlighting an ePDCCH according to example embodiments described herein.
Figure 4:
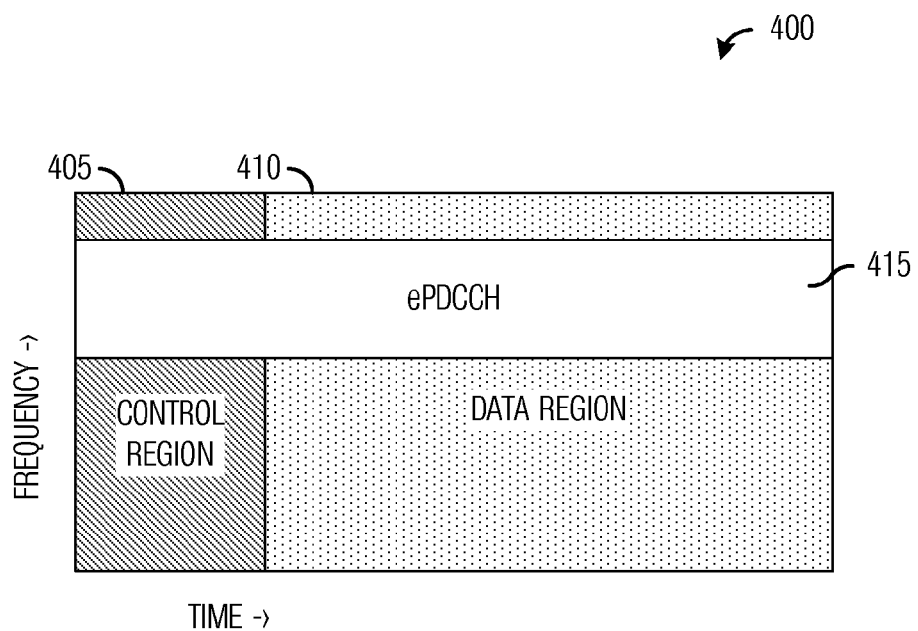
FIG. 4 illustrates an example structure of a second subframe of a 3GPP LTE compliant communications system highlighting an ePDCCH according to example embodiments described herein.

FIG. 3 illustrates a structure of a first subframe 300 of a 3GPP LTE compliant communications system highlighting an ePDCCH. As shown in FIG. 3, subframe 300 includes a control region 305 and a data region 310. An ePDCCH 315 is located in data region 310. FIG. 4 illustrates a structure of a second subframe 400 of a 3GPP LTE compliant communications system highlighting an ePDCCH. As shown in FIG. 4, subframe 400 includes a control region 405 and a data region 410. An ePDCCH 415 is located in control region 405 and data region 410. It is noted that the representations of subframes 300 and 400 shown in FIGS. 3 and 4 are logical domain representations and that the ePDCCHs may occupy non-contiguous frequency resources.

There may be several scenarios where it may be desirable for the ePDCCH to occupy both a control region and a data region. In a first scenario, multiple remote radio heads (RRH) may be used with the same cell identifier, cell ID. In such a case, several RRHs transmit in the same cell. One of the RRH (e.g., a macro-cell) may transmit a PDCCH, and another RRH (e.g., a pico-cell) may transmit an ePDCCH. If the UE for which the ePDCCH is intended is far from the RRH transmitting the PDCCH, the ePDCCH may start in the control region (e.g., at symbol #0 ). The UE may then be able to decode it, as long as the interference created by the PDCCH is sufficiently low.

In a second scenario, there may be no PDCCH transmission. If the eNB does not transmit any PDCCH (for instance, if there is no rel-10 or earlier UE scheduled), then the control region may only contain the PCFICH, the PHICH, and reference signals. In such a case, the control region may be sparsely occupied, and it may be possible to start the ePDCCH transmission for rel-11 UEs in the control region (e.g., at symbol #0). It is noted that there may be other scenarios where it may be desirable to have the ePDCCH occupy both a control region and a data region, such as when there are few CCEs occupied by a PDCCH transmission in the control region, and the like.

It may be advantageous for compatible UEs to start PDSCH transmission in a control region as well. As an example, when there is no PDCCH transmission in the control region, there are plenty of resource blocks (RBs) with no resource elements used for transmitting the control channel. It is noted that RBs are the basic resource unit of 3GPP LTE. A RB comprises a plurality of resource elements (a symbol-subcarrier unit) and may be allocated to carry information and/or data. With RBs with no resource elements used for transmitting the control channel, the PDSCH transmission may start in the control region. In the discussion presented below, a PDSCH that starts in the control region is referred to as an ePDSCH to help prevent confusion. The terminology PDSCH will be used for Rel-10 compliant PDSCH only.

Figure 5:
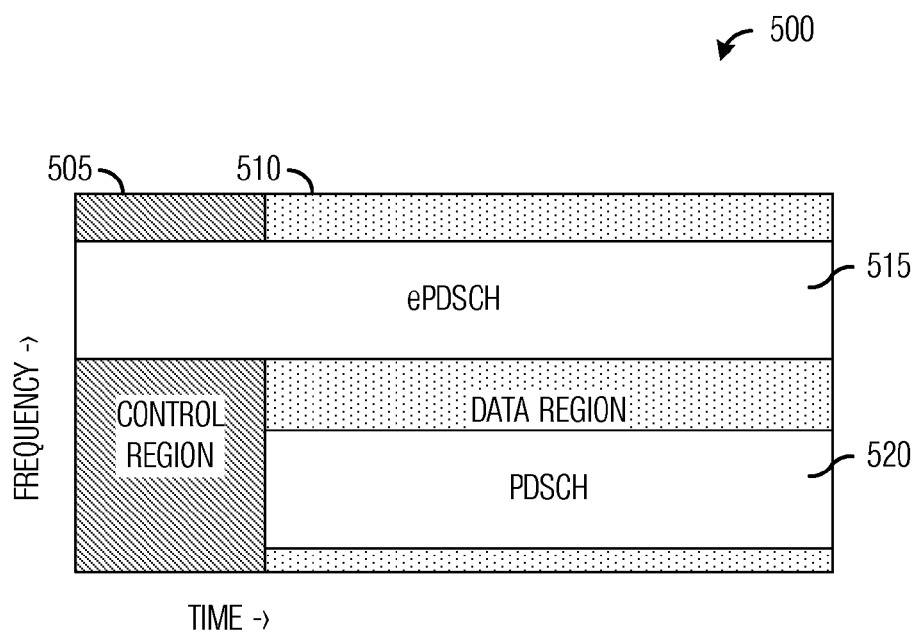
FIG. 5 illustrates an example structure of a subframe of a 3GPP LTE compliant communications system highlighting an ePDSCH and a PDSCH according to example embodiments described herein.

FIG. 5 illustrates a structure of a subframe 500 of a 3GPP LTE compliant communications system highlighting an ePDSCH and a PDSCH. Subframe 500 includes a control region 505 and a data region 510. As shown in FIG. 5, subframe 500 includes an ePDSCH 515 that is located in both control region 505 and data region 510 and a PDSCH 520 that is located only in data region 510. ePDSCH 515 may start at a variety of symbols in control region 505, e.g., symbol 0, 1, 2, or 3. However, in FIG. 5, ePDSCH 515 is shown as starting at symbol 0 to maximize data content.

A starting point of PDSCH 520 may be indicated by an indicator in the PCFICH that specifies a number of symbols occupied by control region 505. PDSCH 520 (and data region 510) may then start at the next symbol. As an example, if control region 505 occupies 2 symbols (symbols 0, and 1), then PDSCH 520 may start at the 3rd symbol, symbol 2.

According to an example embodiment, a starting symbol (or starting point) of an ePDSCH may differ. As an example, the starting symbol for ePDSCHs may be the same for all UEs. As another example, the starting symbol for ePDSCHs may be UE dependent, differing for different UEs. An ePDSCH with a varying starting symbol may allow for avoidance of interference from control channels, such as PDCCH, from other cells. Since the level of interference varies with UE location, the starting point of an ePDSCH may differ between different UEs, depending on the level of interference seen from control channels of neighboring cells.

In a situation when the starting point of ePDSCHs is the same for all UEs, there are several techniques that may be used to indicate to the UEs the starting point. A first technique sets the starting point at a particular symbol, such as symbol 0 Fixing the starting point eliminates the need for signaling the starting point, therefore ensuring maximum resource utilization. However, no flexibility is provided to combat interference from control channels from neighboring cells.

A second technique uses an indicator in the PCFICH to indicate the starting point of the ePDSCH. In 3GPP LTE Rel-10, there are three possible values for the number of symbols occupied by the control region: 1, 2, 3 or 2, 3, 4 depending on bandwidth. Three possible values require the use of a two-bit indicator, which provides for up to four possible values. Therefore, one value is unused. The fourth value may then be used to indicate the starting point of the ePDSCH. As an example, the presence of the fourth value indicates that the starting point of the ePDSCH is at symbol 0.

As an illustrative example, when the bits of the indicator in the PCFICH are remapped, the following rule may be used to remap the 4 possible values, since only 3 of the 4 are needed (1, 2, 3 when the bandwidth is greater than 10 RBs, 2, 3, 4 when the bandwidth is smaller than or equal to 10 RBs):

1) 1, 2, 3, 4 to 1, 2, 3, 0, respectively, when bandwidth is greater than 10 RBs; and
2) 1, 2, 3, 4 to 0, 2, 3, 4, respectively, when bandwidth is smaller or equal to 10 RBs.

An example of mapping function for 1) is f=(indicator) modulo 4. An example of mapping function for 2) is f=floor((5*indicator−2)/4). Therefore, if the UE receives the indicator and it is equal to 0, then the UE knows that the starting point of the ePDSCH is at symbol 0.

A third technique uses a radio resource control (RRC) parameter, e.g., pdsch-start, to indicate the starting point of the ePDSCH. In 3GPP LTE Rel-10, an RRC parameter, e.g., pdsch-start, is used to indicate the number of symbols occupied by the control region: 1, 2, 3 or 2, 3, 4 depending on bandwidth. The three possible values require the use of a two-bit RRC parameter, which provides for up to four possible values. Therefore, one value is unused. The fourth value may then be used to indicate the starting point of the ePDSCH. As an example, the presence of the fourth value indicates that the starting point of the ePDSCH is at symbol 0.

As an illustrative example, when the bits of the RRC parameter are remapped, the following rule may be used to remap the 4 possible values, since only 3 of the 4 are needed (1, 2, 3 when the bandwidth is greater than 10 RBs, 2, 3, 4 when the bandwidth is smaller than or equal to 10 RBs):

i) 1, 2, 3, 4 to 1, 2, 3, 0, respectively, when bandwidth is greater than 10 RBs; and
ii) 1, 2, 3, 4 to 0, 2, 3, 4, respectively, when bandwidth is smaller or equal to 10 RBs.

An example of mapping function for i) is f=(pdsch-start) modulo 4. An example of mapping function for ii) is f=floor((5*pdsch-start−2)/4). Therefore, if the UE receives the RRC parameter and it is equal to zero, then the UE knows that the starting point of the ePDSCH is at symbol 0.

A fourth technique places an indicator of the starting point of the ePDSCH in a common search space of a control channel, e.g., a PDCCH or an ePDCCH. In general, a search space comprises a group of resources that a UE searches to find a control channel, e.g., a PDCCH or an ePDCCH, intended for it. The indicator of the starting point of the ePDSCH may also be located in the search space of the control channel so that the UE will find the indicator as it searches for the control channel. It is noted that the indicator may be a multi-bit value to indicate multiple possible starting points for the ePDSCH.

In a situation when the starting point of ePDSCHs are UE specific, there are several techniques that may be used to indicate the starting point of the ePDSCHs to the UEs. A first technique uses an indicator that is part of a resource grant to the UE. As an example, the indicator of the starting point of ePDSCHs for a particular UE is included in a resource grant sent to the UE. The use of a resource grant may require the use of a new field in the DCI format to indicate the starting symbol of the ePDSCH. As an example, a two-bit field coded similarly as the pdsch-start RRC parameter discussed above may be used.

A second technique uses a radio resource control (RRC) parameter, e.g., pdsch-start, to indicate the starting point of the ePDSCH. In 3GPP LTE Rel-10, an RRC parameter, e.g., pdsch-start, is used to indicate the number of symbols occupied by the control region: 1, 2, 3 or 2, 3, 4 depending on bandwidth. The three possible values require the use of a two-bit RRC parameter, which provides for up to four possible values. Therefore, one value is unused. The fourth value may then be used to indicate the starting point of the ePDSCH. As an example, the presence of the fourth value indicates that the starting point of the ePDSCH is at symbol 0. The illustrative example of the use of the RRC parameter for the case with the same starting point for all UEs also applies to this technique.

A third technique places an indicator of the starting point of the ePDSCH in a common search space of a control channel, e.g., a PDCCH or an ePDCCH. In general, a search space comprises a group of resources that a UE searches to find a control channel, e.g., a PDCCH or an ePDCCH, intended for it. The indicator of the starting point of the ePDSCH may also be located in the search space of the control channel so that the UE will find the indicator as it searches for the control channel. It is noted that the indicator may be a multi-bit value to indicate multiple possible starting points for the ePDSCH.

Figure 6A:
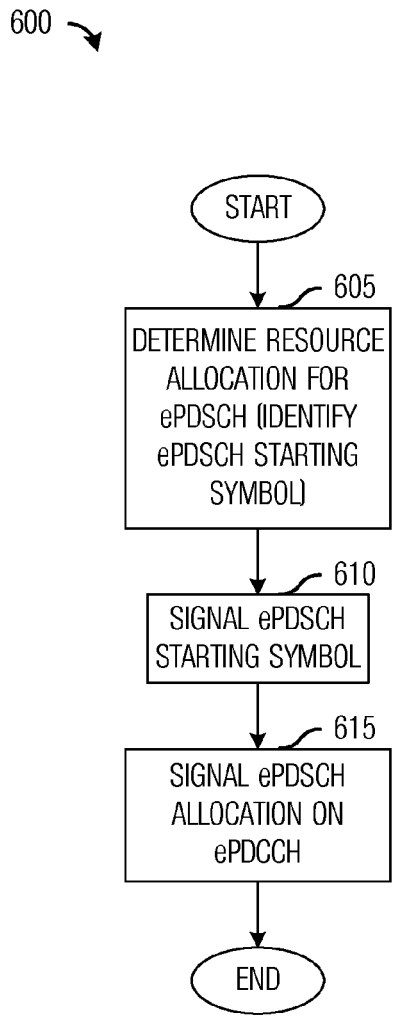
FIG. 6a illustrates an example flow diagram of eNB operations in transmitting an ePDSCH according to example embodiments described herein.

FIG. 6a illustrates a flow diagram of eNB operations 600 in transmitting an ePDSCH. eNB operations 600 may be indicative of operations occurring in an eNB, such as eNB 105, as the eNB transmits an ePDSCH to a UE, such as UE 110 and UE 112.

eNB operations 600 may begin with the eNB determining a resource allocation for the ePDSCH that it is transmitting to the UE (block 605). The resource allocation may include which RBs are to be occupied by the ePDSCH and a starting point (e.g., a starting symbol) for the ePDSCH. The resource allocation may also include other information, such as ePDSCH ending point (e.g., an ending symbol), ePDSCH resource element (RE) and/or antenna port mapping, and the like. In general, the starting point of an ePDSCH lies within a control region of a subframe.

Figure 6B:
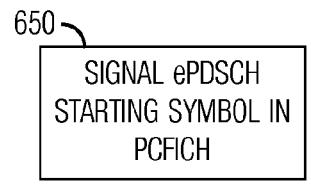
FIGS. 6b, 6c, 6d, and 6e illustrate example starting point signaling according to example embodiments described herein.
Figure 6C:
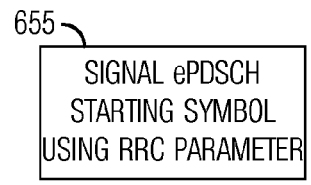
Figure 6D:
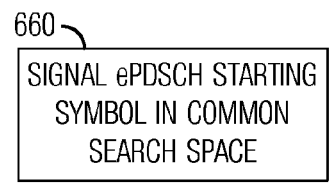
Figure 6E:
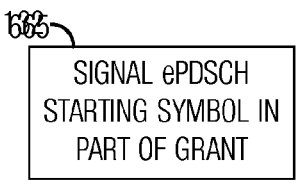

The eNB may signal the starting point (e.g., the starting symbol) for the ePDSCH (block 610). As discussed previously, the eNB may use an unused state of an indicator in the PCFICH to indicate the starting point for the ePDSCH (shown as block 650 of FIG. 6b). Also discussed previously, the eNB may use an unused state of a RRC parameter to indicate the starting point of the ePDSCH (shown as block 655 of FIG. 6c). Also discussed previously, the eNB may use an indicator located in a common search space of a control channel, such as a PDCCH or ePDCCH, to indicate the starting point of the ePDSCH (shown as block 660 of FIG. 6d). Also discussed previously, the eNB may use an indicator that is part of a resource grant for the ePDSCH sent to the UE to indicate the starting point of the ePDSCH (shown as block 665 of FIG. 6e). It is noted that if the starting point of the ePDSCH is always fixed, e.g., at symbol 0 then the eNB may not need to signal the starting point for the ePDSCH.

It is noted that the signaling of the starting point of the ePDSCH need not occur for each ePDSCH. As an example, if the RRC parameter is used, a previously received ePDSCH starting point may be assumed to be valid until a new RRC parameter is received.

Referencing back to FIG. 6a, the eNB may signal the ePDSCH allocation, e.g., the RBs to be occupied by the ePDSCH, ePDSCH ending point, ePDSCH RE and/or antenna port mapping, and the like, to the UE (block 615).

The ePDSCH allocation may be signaled on an ePDCCH that corresponds to the ePDSCH. Existing, modified, or new downlink control indicator (DCI) format(s) may be used. It is noted that the signaling of the ePDSCH starting point and the ePDSCH allocation may be transmitted in a single message, such as in a message with a modified or new DCI format.

Figures 7A, 7B, 7C, 7D, 7E:
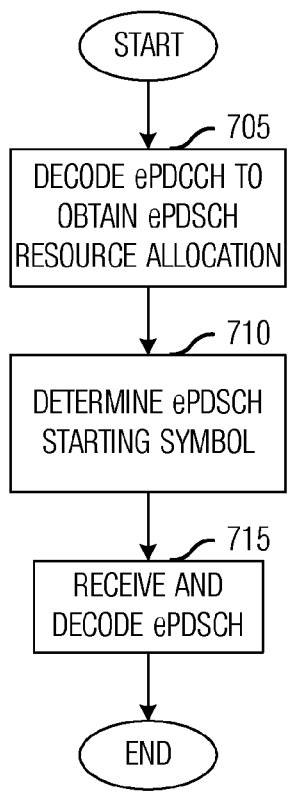
FIG. 7a illustrates an example flow diagram of UE operations in receiving an ePDSCH according to example embodiments described herein.
FIGS. 7b, 7c, 7d, and 7e illustrate example starting point determining according to example embodiments described herein.

FIG. 7a illustrates a flow diagram of UE operations 700 in receiving an ePDSCH. UE operations 700 may be indicative of operations occurring in a UE, such as UE 110 and UE 112, as the UE receives an ePDSCH from an eNB, such as eNB 105.

UE operations 700 may begin with the UE decoding an ePDCCH to obtain its ePDSCH allocation (block 705). The ePDSCH allocation may include which RBs are to be occupied by the ePDSCH. The resource allocation may also include other information, such as ePDSCH ending point (e.g., an ending symbol), ePDSCH range extension (RE) and/or antenna port mapping, and the like.

The UE may determine a starting point (e.g., a starting symbol) of the ePDSCH (block 710). In general, the starting point of an ePDSCH lies within a control region of a subframe. As discussed previously, an unused state of an indicator in the PCFICH may be used to indicate the starting point for the ePDSCH, so the UE may search in the PCFICH to find the indicator and determine the starting point (shown as block 750 of FIG. 7b). Also discussed previously, an unused state of a RRC parameter may be used to indicate the starting point of the ePDSCH, so the UE may search for the RRC parameter to determine the starting point (shown as block 755 of FIG. 7c). Also discussed previously, an indicator located in a common search space of a control channel, such as a PDCCH or ePDCCH, may be used to indicate the starting point of the ePDSCH, so the UE may search in the common search space of either the PDCCH or the ePDCCH to determine the starting point (shown as block 760 of FIG. 7d). Also discussed previously, an indicator that is part of a resource grant for the ePDSCH sent to the UE may be used to indicate the starting point of the ePDSCH, so the UE may search in the resource grant for the indicator to determine the starting point (shown as block 765 of FIG. 7e). It is noted that if the starting point of the ePDSCH is always fixed, e.g., at symbol 0, then the UE may not need to determine the starting point for the ePDSCH.

It is noted that the signaling of the starting point of the ePDSCH need not occur for each ePDSCH. If the UE does not find a new indicator of the starting point of the ePDSCH, it may assume that a previously received ePDSCH starting point and use that starting point until it receives a new indicator of the starting point of the ePDSCH. It is also noted that the signaling of the ePDSCH starting point and the ePDSCH allocation may be received in a single message, such as in a message with a modified or new DCI format.

Referencing back now to FIG. 7a, the UE may receive and decode the ePDSCH using the starting point and the ePDSCH allocation (block 715).

Since the control region may not be fully unoccupied, a situation may arise where some REs may be allocated to multiple channels, such as to both an ePDSCH and the PCFICH. In such a situation, the REs used by the PCFICH (or any other channel, such as the PHICH and the like) are not considered as being occupied by the ePDSCH. The UE may not assume that the REs where the PCFICH is present are used by the ePDSCH, and the eNB may not transmit any bits conveyed on the ePDSCH on a RE occupied by the PCFICH. It is noted that there is no ambiguity for the UE since the UE knows where the PCFICH (or any other channel, such as the PHICH and the like) is located. It is also noted that if an ePDCCH is mapped onto resources where a PCFICH or PHICH is presented, similar rules may apply.

Figure 8:
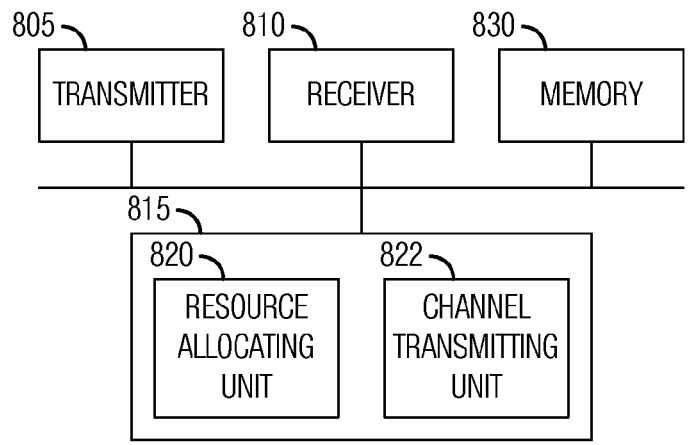
FIG. 8 illustrates an example diagram of a first communications device according to example embodiments described herein.

FIG. 8 illustrates a diagram of a first communications device 800. Communications device 800 may be an implementation of a communications controller, such as a eNB, of a communications system. Communications device 800 may be used to implement various ones of the embodiments discussed herein. As shown in FIG. 8, a transmitter 805 is configured to send control channels, indicators, messages, and the like, and a receiver 810 is configured to receive messages, and the like. Transmitter 805 and receiver 810 may have a wireless interface, a wireline interface, or a combination thereof.

A resource allocating unit 820 is configured to allocate resources for a control channel, such as an ePDSCH. Resource allocating unit 820 may allocate which RBs are to be occupied by the control channel and a starting point (e.g., a starting symbol) for the control channel. The resource allocation may also include other information, such as control channel ending point (e.g., an ending symbol), control channel resource element (RE) and/or antenna port mapping, and the like. A channel transmitting unit 822 is configured to transmit (or signal) information, such as resource allocation information about the control channel. Channel transmitting unit 822 may transmit the resource allocation using a single message or multiple messages. As an example, channel transmitting unit 822 may separately transmit the starting point of the control channel and the remainder of the resource allocation. As another example, channel transmitting unit 822 may transmit the starting point of the control channel and the remainder of the resource allocation in a single message. A memory 830 is configured to store control channels, resource allocations for the control channels, messages, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while resource allocating unit 820 and channel transmitting unit 822 may be software modules executing in a processor 815, such as a microprocessor, a digital signal processor, a custom circuit, or a custom compiled logic array of a field programmable logic array. Additionally, resource allocating unit 820 and channel transmitting unit 822 may be stored in memory 830.

Figure 9:
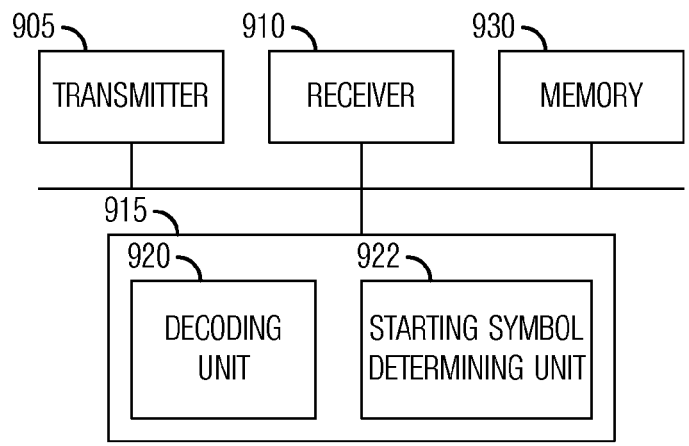
FIG. 9 illustrates an example diagram of a second communications device according to example embodiments described herein.

FIG. 9 illustrates a diagram of a second communications device 900. Communications device 900 may be an implementation of a communications device, such as a UE, of a communications system. Communications device 900 may be used to implement various ones of the embodiments discussed herein. As shown in FIG. 9, a transmitter 905 is configured to send messages, and the like, and a receiver 910 is configured to receive control channels, indicators, messages, and the like. Transmitter 905 and receiver 910 may have a wireless interface, a wireline interface, or a combination thereof.

A decoding unit 920 is configured to decode a transmission. Decoding unit 920 decodes information located in resources associated with the transmission in accordance with a known modulation and coding scheme. As an example, decoding unit 920 decodes information located in resources associated with an ePDCCH to obtain a resource allocation for an ePDSCH. A starting symbol determining unit 922 is configured to determine a starting point, e.g., a starting symbol, of a control channel, such as an ePDSCH. Depending on a signaling technique used by a communications controller serving communications device 900, starting symbol determining unit 922 may determine the starting point of the control channel by searching in a PCFICH for an indicator of the starting point, searching for an RRC parameter for an indicator of the starting point, searching in a common search space of a control channel (such as a PDCCH or an ePDCCH) for an indicator of the starting point, searching in a resource grant of the ePDSCH for an indicator of the starting point, and the like. A memory 930 is configured to store control channels, resource allocations for the control channels, starting points, messages, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while decoding unit 920 and starting symbol determining unit 922 may be software modules executing in a processor 915, such as a microprocessor, a digital signal processor, a custom circuit, or a custom compiled logic array of a field programmable logic array. Additionally, decoding unit 920 and starting symbol determining unit 922 may be stored in memory 930.

Although the present disclosure and its advantages have been described in detail, it should be understood that various changes, substitutions and alterations can be made herein without departing from the spirit and scope of the disclosure as defined by the appended claims.

What is claimed is:
1. A method for operating a communications controller, the method comprising:
allocating, by the communications controller, a first set of resource elements within a legacy control region of a subframe to a physical downlink control channel (PDCCH);
allocating, by the communications controller, a second set of resource blocks to an enhanced physical downlink shared channel (ePDSCH), wherein the resource blocks comprise respective resource elements;
allocating, by the communications controller, a third set of resource blocks to an enhanced physical downlink control channel (ePDCCH), wherein the third set of resource blocks comprises resource elements of a data region of the subframe, and wherein the ePDCCH has a first starting point;
allocating, by the communications controller, a fourth set of resource blocks within the data region to a physical downlink shared channel (PDSCH);
identifying, by the communications controller, a starting point for the respective resource elements of the second set of resource blocks of the ePDSCH, the starting point of the ePDSCH located within the legacy control region and overlapping in time with control channel information in the legacy control region, wherein the first starting point of the ePDCCH is located within the legacy control region, and wherein the starting point of the ePDSCH is after the first starting point of the ePDCCH; and signaling, by the communications controller, to a user equipment (UE), the starting point and a number of the resource blocks allocated to the ePDSCH.

2. The method of claim 1, further comprising signaling the starting point in a state of an indicator of a control channel, the state unused in indicating other information.

3. The method of claim 2, wherein the control channel is a physical control format indicator channel.

4. The method of claim 1, further comprising signaling the starting point in a state of a radio resource control parameter, the state unused in indicating other information.

5. The method of claim 4, wherein the radio resource control parameter is a pdsch-start parameter.

6. The method of claim 1, further comprising signaling the starting point in a common search space of a control channel.

7. The method of claim 6, wherein the control channel comprises one of the PDCCH and the ePDCCH.

8. The method of claim 1, further comprising signaling the starting point in a grant of the ePDSCH.

9. The method of claim 1, further comprising signaling the number of the resource blocks allocated to the ePDSCH on an enhanced physical downlink control channel.

10. The method of claim 1, wherein the legacy control region is a Third Generation Partnership Project (3PP) Long Term Evolution (LTE) Release 10 (Rel-10) control region.

11. The method of claim 1, wherein the ePDSCH is scheduled by the ePDCCH.

12. A method for operating a user equipment (UE), the method comprising:

decoding, by the UE, a physical downlink control channel (PDCCH) occupying a legacy control region of a subframe to obtain a first set of resource blocks allocated in a data region of the subframe to a physical downlink shared channel (PDSCH);

decoding, by the UE, an enhanced physical downlink control channel (ePDCCH) to obtain a second set of resource blocks allocated to an enhanced physical shared channel (ePDSCH), wherein the ePDCCH has a first starting point;

determining, by the UE, a starting point for respective resource elements of the second set of resource blocks for the ePDSCH, the starting point of the ePDSCH located in the legacy control region and overlapping in time with control channel information in the legacy control region, wherein the first starting point of the ePDCCH is located within the legacy control region, and wherein the starting point of the ePDSCH is after the first starting point of the ePDCCH; and receiving, by the UE, the ePDSCH in accordance with the starting point and a number of the resource blocks allocated to the ePDSCH.

13. The method of claim 12, wherein determining the starting point comprises:

receiving a physical control format indicator channel with a first indicator from a communications controller; and setting the starting point in accordance to the first indicator.

14. The method of claim 12, wherein determining the starting point comprises:

receiving a radio resource control message with a radio resource control parameter; and setting the starting point in accordance with the radio resource control parameter.

15. The method of claim 12, wherein determining the starting point comprises:

searching for a second indicator in a common search space of a control channel; and setting the starting point in accordance with the second indicator.

16. The method of claim 15, wherein the control channel comprises one of the PDCCH and the ePDCCH.

17. The method of claim 12, wherein determining the starting point comprises:

receiving a grant for the ePDSCH, the grant including a third indicator; and setting the starting point in accordance with the third indicator.

18. The method of claim 12, further comprising decoding the ePDSCH in accordance with the starting point and the number of the resource blocks allocated to the ePDSCH.

19. The method of claim 12, wherein the legacy control region is a Third Generation Partnership Project (3PP) Long Term Evolution (LTE) Release 10 (Rel-10) control region.

20. The method of claim 12, wherein the ePDSCH is scheduled by the ePDCCH.

21. A communications controller comprising:

a processor configured to:

allocate a first set of resource elements within a legacy control region of a subframe to a physical downlink control channel (PDCCH), allocate a second set of resource blocks to an enhanced physical downlink shared channel (ePDSCH), and to identify a starting point for respective resource elements of the second set of resource blocks of the ePDSCH, the starting point of the ePDSCH located within the legacy control region and overlapping in time with control channel information in the legacy control region, allocate a third set of resource blocks within a data region of the subframe to an enhanced physical downlink control channel (ePDCCH), wherein the third set of resource blocks comprises resource elements of a data region of the subframe, wherein the ePDCCH has a first starting point, wherein the first starting point of the ePDCCH is located within the legacy control region, and wherein the starting point of the ePDSCH is after the first starting point of the ePDCCH, and allocate a fourth set of resource blocks within the data region to a physical downlink shared channel (PDSCH); and a transmitter operatively coupled to the processor, the transmitter configured to signal to a user equipment (UE) the starting point and a number of the resource blocks allocated to the ePDSCH.

22. The communications controller of claim 21, wherein the transmitter is configured to signal the starting point in a state of an indicator of a control channel, the state unused in indicating other information.

23. The communications controller of claim 22, wherein the control channel is a physical control format indicator channel.

24. The communications controller of claim 21, wherein the transmitter is configured to signal the starting point in a state of a radio resource control parameter, the state unused in indicating other information.

25. The communications controller of claim 24, wherein the radio resource control parameter is a pdsch-start parameter.

26. The communications controller of claim 21, wherein the transmitter is configured to signal the starting point in a common search space of a control channel.

27. The communications controller of claim 26, wherein the control channel comprises one of the PDCCH and the ePDCCH.

28. The communications controller of claim 21, wherein the transmitter is configured to signal the starting point in a grant of the ePDSCH.

29. The communications controller of claim 21, wherein the transmitter is configured to signal the number of the resource blocks allocated to the ePDSCH on an enhanced physical downlink control channel.

30. The communications controller of claim 21, wherein the legacy control region is a Third Generation Partnership Project (3GPP) Long Term Evolution (LTE) Release 10 (Rel-10) control region.

31. The communications controller of claim 21, wherein the ePDSCH is scheduled by the ePDCCH.

32. A user equipment (UE) comprising:
a processor configured to:
decode a physical downlink control channel (PDCCH) occupying a legacy control region of a subframe to obtain a first set of resource blocks within a data region of the subframe to a physical downlink shared channel (PDSCH), and
decode an enhanced physical downlink control channel (ePDCCH) to obtain a second set of resource blocks allocated to an enhanced physical shared channel (ePDSCH), and to determine a starting point for respective resource elements of the second set of resource blocks for the ePDSCH, the starting point of the ePDSCH located in the legacy control region and overlapping in time with control channel information in the legacy control region, wherein the ePDCCH has a first starting point, wherein the first starting point of the ePDCCH is located within the legacy control region, and wherein the starting point of the ePDSCH is after the first starting point of the ePDCCH; and
a receiver operatively coupled to the processor, the receiver configured to receive the ePDSCH in accordance with the starting point and a number of the resource blocks allocated to the ePDSCH.

33. The UE of claim 32, wherein the receiver is configured to receive a physical control format indicator channel with a first indicator from a communications controller, and wherein the processor is configured to set the starting point in accordance to the first indicator.

34. The UE of claim 32, wherein the receiver is configured to receive a radio resource control message with a radio resource control parameter, and wherein the processor is configured to set the starting point in accordance with the radio resource control parameter.

35. The UE of claim 32, wherein the processor is configured to search for a second indicator in a common search space of a control channel, and to set the starting point in accordance with the second indicator.

36. The UE of claim 32, wherein the receiver is configured to receive a grant for the ePDSCH, the grant including a third indicator, and wherein the processor is configured to set the starting point in accordance with the third indicator.

37. The UE of claim 32, wherein the processor is configured to decode the ePDSCH in accordance with the starting point and the number of the resource blocks allocated to the ePDSCH.

38. The UE of claim 32, wherein the legacy control region is a Third Generation Partnership Project (3PP) Long Term Evolution (LTE) Release 10 (Rel-10) control region.

39. The UE of claim 32, wherein the ePDSCH is scheduled by the ePDCCH.

* * * * *